(12) United States Patent
Kim

(10) Patent No.: US 12,498,230 B2
(45) Date of Patent: Dec. 16, 2025

(54) AUTONOMOUS VEHICLE, CONTROL SYSTEM FOR REMOTELY CONTROLLING THE SAME, AND METHOD THEREOF

(71) Applicants: Hyundai Motor Company, Seoul (KR); Kia Corporation, Seoul (KR)

(72) Inventor: Il Hwan Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 111 days.

(21) Appl. No.: 17/578,714

(22) Filed: Jan. 19, 2022

(65) Prior Publication Data

US 2023/0024151 A1 Jan. 26, 2023

(30) Foreign Application Priority Data

Jul. 21, 2021 (KR) ........................ 10-2021-0096007

(51) Int. Cl.
*G01C 21/34* (2006.01)
*B60W 60/00* (2020.01)
*H04W 4/90* (2018.01)

(52) U.S. Cl.
CPC ..... *G01C 21/3438* (2013.01); *B60W 60/0025* (2020.02); *G01C 21/3453* (2013.01); *H04W 4/90* (2018.02); *B60W 2540/043* (2020.02); *B60W 2540/221* (2020.02); *B60W 2556/45* (2020.02)

(58) Field of Classification Search
CPC .................. G05D 1/0011–005; G05D 1/0088
USPC .................................................. 701/2, 23–28
See application file for complete search history.

(56) References Cited

U.S. PATENT DOCUMENTS

| 10,831,191 | B1* | 11/2020 | Fields | G05D 1/0278 |
| 2018/0043901 | A1* | 2/2018 | Kim | A61B 5/747 |
| 2018/0120837 | A1* | 5/2018 | Regmi | A61B 5/01 |
| 2019/0197438 | A1* | 6/2019 | Meredith | G16H 10/60 |
| 2019/0359220 | A1* | 11/2019 | Wilson | G05D 1/0055 |

(Continued)

FOREIGN PATENT DOCUMENTS

| DE | 102019115123 A1 * | 12/2020 |
| JP | 2005050183 A * | 2/2005 |

(Continued)

OTHER PUBLICATIONS

Hagino M—English description of JP-2005050183-A via Espacenet Patent Translate, retrieved Feb. 6, 2024. (Year: 2024).*

(Continued)

*Primary Examiner* — Erin M Piateski
*Assistant Examiner* — Paul Allen
(74) *Attorney, Agent, or Firm* — Fox Rothschild LLP

(57) ABSTRACT

An autonomous vehicle includes a control system for remotely controlling the same. The autonomous vehicle includes an autonomous driving control apparatus having a processor that is configured to transmit an emergency request message to a control system when an emergency occurs to an emergency patient in the vehicle during autonomous driving, and the autonomous driving control apparatus is configured to direct the autonomous vehicle to follow a path with a shortest estimated required time among a contact path with an ambulance, a contact path with a neighboring vehicle capable of first aid, or a travel path to a hospital depending on remote control of the control system.

9 Claims, 10 Drawing Sheets

(56) References Cited

U.S. PATENT DOCUMENTS

| | | | | |
|---|---|---|---|---|
| 2019/0361451 A1* | 11/2019 | Wilson | .................... | G08G 1/205 |
| 2021/0107523 A1* | 4/2021 | Lacaze | .................... | G08G 1/166 |
| 2021/0203066 A1* | 7/2021 | Kim | ....................... | H01Q 21/28 |
| 2021/0293572 A1* | 9/2021 | Konrardy | ................. | G06F 21/55 |
| 2022/0001900 A1* | 1/2022 | Shimotani | ............. | B60W 10/30 |

FOREIGN PATENT DOCUMENTS

| | | | |
|---|---|---|---|
| KR | 2019-0140499 A | | 12/2019 |
| WO | WO-2018017075 A1 | * | 1/2018 |

OTHER PUBLICATIONS

Keller C G—English description of DE-102019115123-A1 via Espacenet Patent Translate, retrieved Feb. 6, 2024. (Year: 2024).*

* cited by examiner

AUTONOMOUS VEHICLE, CONTROL SYSTEM FOR REMOTELY CONTROLLING THE SAME, AND METHOD THEREOF

CROSS-REFERENCE TO RELATED APPLICATION

This application claims under 35 U.S.C. § 119(a) the benefit of Korean Patent Application No. 10-2021-0096007, filed in the Korean Intellectual Property Office on Jul. 21, 2021, the entire contents of which are incorporated herein by reference.

BACKGROUND

(a) Technical Field

The present disclosure relates to an autonomous vehicle, a control system for remotely controlling the same, and a method thereof, more particularly, to a technique capable of safely and quickly transporting an emergency patient to a hospital through remote control when an emergency occurs during autonomous driving.

(b) Description of the Related Art

As capabilities for autonomous driving in vehicles advance, an interest in an autonomous vehicle that drives to a destination by recognizing a driving environment of the vehicle itself without manipulation of a user continues to grow.

An autonomous vehicle refers to a vehicle capable of operating by itself without manipulation by a driver or a passenger.

A technique for controlling movement of a vehicle to a predetermined destination such as a hospital through remote control is provided when a user is determined to be in an abnormal state by determining a condition of the user based on a heart rate, breathing, and an eye movement of the user.

However, there is a need for a method to shorten a transport time in consideration of a critical time, etc. and to allow emergency patients to receive emergency treatment quickly in addition to simply transporting emergency patients to hospitals in the case where a critical situation occurs.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure provides an autonomous vehicle, a control system for remotely controlling the same, and a method thereof, capable of safely and quickly transporting an emergency patient to a hospital through remote control based on neighboring vehicle information, an ambulance position, a road condition, etc., when the emergency occurs during autonomous driving.

The technical objects of the present disclosure are not limited to the objects mentioned above, and other technical objects not mentioned can be clearly understood by those skilled in the art from the description of the claims.

An exemplary embodiment of the present disclosure provides an autonomous vehicle, including an autonomous driving control apparatus having a processor that transmits an emergency request message to a control system when an emergency occurs to an emergency patient in the vehicle during autonomous driving, and the autonomous driving control apparatus is configured to direct the autonomous vehicle to follow a path with a shortest estimated required time among a contact path with an ambulance, a contact path with a neighboring vehicle capable of first aid, or a travel path to a hospital depending on remote control of the control system.

In an exemplary embodiment, the processor may transmit a condition of the emergency patient and vehicle position information to the control system together when transmitting the emergency request message.

In an exemplary embodiment, it may further include a sensing device configured to detect occurrence of the emergency to the emergency patient in the vehicle.

In an exemplary embodiment, the processor may determine whether the emergency patient has suffered from a life-threatening condition based on a result detected by the sensing device.

In an exemplary embodiment, it may further include a communication device configured to automatically transmit the emergency request message to the control system when the emergency occurs.

An exemplary embodiment of the present disclosure provides a control system including a processor configured to request an ambulance to a nearby hospital when receiving an emergency request message from an autonomous vehicle, to determine a path with a shortest estimated required time among a path for the autonomous vehicle to make contact with the ambulance, a path for the autonomous vehicle to make contact with a neighboring vehicle capable of first aid, or a path for the autonomous vehicle to travel to the hospital, and to remotely control the autonomous vehicle.

In an exemplary embodiment, the processor may generate at least one of the path for the autonomous vehicle to make contact with the ambulance, the path for the autonomous vehicle to make contact with the neighboring vehicle capable of first aid, or the path for the autonomous vehicle to travel to the hospital, based on a traffic situation. In an exemplary embodiment, the processor may remotely control the autonomous vehicle by selecting a path with a shorter estimated required time among the path for the autonomous vehicle to make contact with the ambulance or the path for the autonomous vehicle to travel to the hospital.

In an exemplary embodiment, the processor may transmit the emergency request message to neighboring vehicles.

In an exemplary embodiment, the processor may transmit the emergency request message to a neighboring vehicle corresponding to at least one of within the selected path, within a predetermined range from the selected path, or within a predetermined range from a current position of the autonomous vehicle.

In an exemplary embodiment, whether there is an occupant capable of cardiopulmonary resuscitation or first aid may be received from the neighboring vehicle that has received the emergency request message.

In an exemplary embodiment, the processor, when there is a neighboring vehicle in which there is the occupant capable of cardiopulmonary resuscitation or first aid, may generate a path for the neighboring vehicle to join a path of the autonomous vehicle.

In an exemplary embodiment, the processor may calculate estimated times of the selected path and the path for the neighboring vehicle to join the path of the autonomous vehicle to compare them.

In an exemplary embodiment, the processor, when the estimated time of the selected path is equal to or shorter than the estimated time of the path for the neighboring vehicle to join the path of the autonomous vehicle, may remotely control the autonomous vehicle to follow and control the selected path.

In an exemplary embodiment, the processor, when the estimated time of the selected path is longer than the estimated time of the path for the neighboring vehicle to join the path of the autonomous vehicle, may transmit the path for the neighboring vehicle to join the path of the autonomous vehicle to the neighboring vehicle.

In an exemplary embodiment, the processor may receive whether joining is possible from the neighboring vehicle.

In an exemplary embodiment, the processor, when the neighboring vehicle is able to join the path for joining it, may remotely control the autonomous vehicle to make contact with the neighboring vehicle.

In an exemplary embodiment, the processor, when first aid for an emergency patient in the autonomous vehicle is completed by the occupant in the neighboring vehicle, may remotely control the autonomous vehicle to follow the selected path.

In an exemplary embodiment, the processor, when the neighboring vehicle is unable to join the path for joining it, may remotely control the autonomous vehicle to follow the selected path.

An exemplary embodiment of the present disclosure provides a remote control method for an autonomous vehicle, including: receiving, by a processor, an emergency request message from the autonomous vehicle; requesting, by the processor, an ambulance to a nearest hospital from a current position of the autonomous vehicle; determining, by the processor, a path with a shortest estimated required time among a path for the autonomous vehicle to make contact with the ambulance, a path for the autonomous vehicle to make contact with a neighboring vehicle capable of first aid, or a path for the autonomous vehicle to travel to the hospital; and remotely controlling, by the processor, the autonomous vehicle to follow the path with the shortest estimated required time.

According to the present technique, it is possible to safely and quickly transport an emergency patient to a hospital through remote control based on neighboring vehicle information, an ambulance position, a road condition, etc., when an emergency occurs during autonomous driving, and it is possible to increase a survival probability of a user by receiving first aid through an occupant in a neighboring vehicle before the ambulance arrives.

DETAILED DESCRIPTION OF THE EMBODIMENTS

Figure 1:
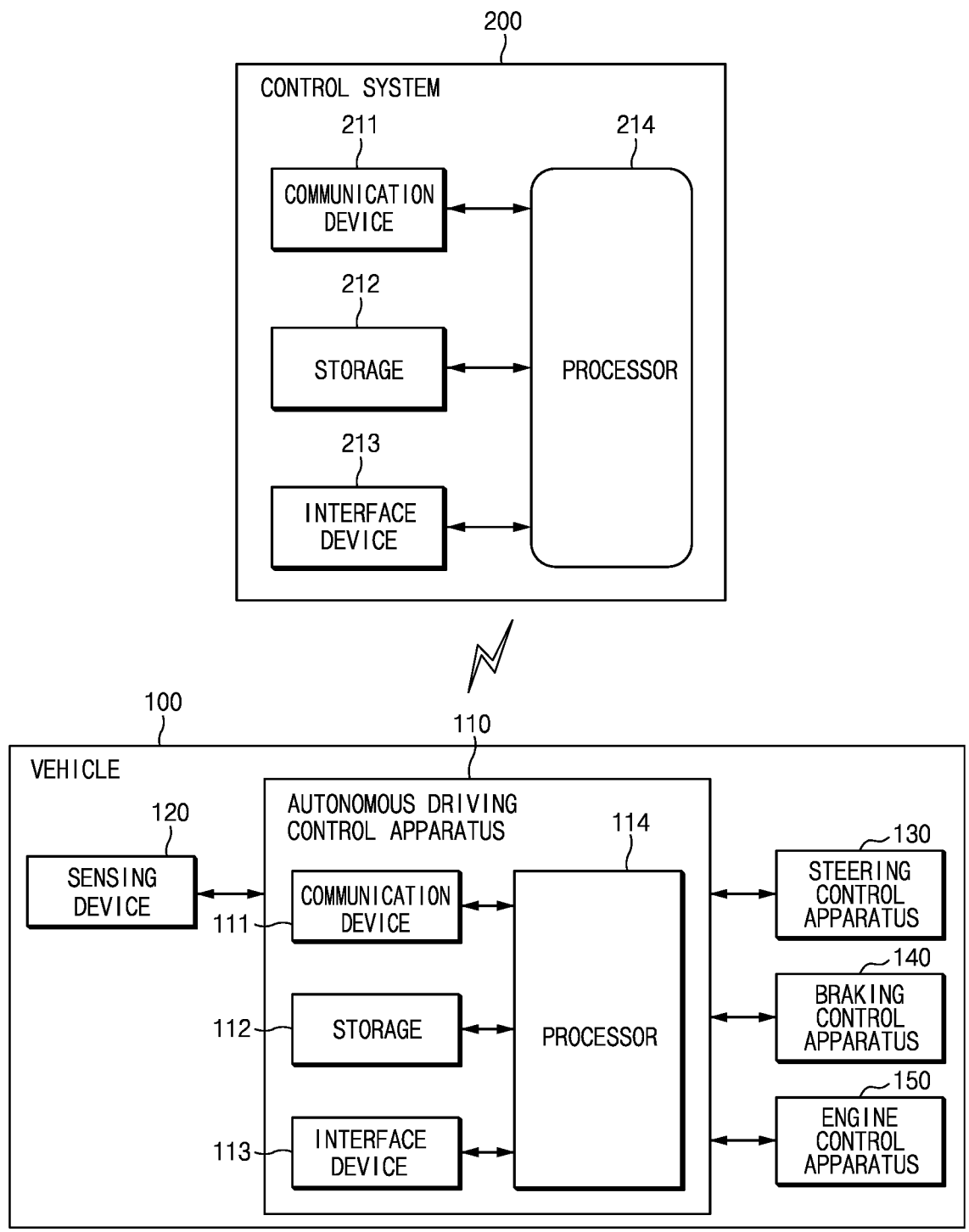
FIG. 1 illustrates a block diagram showing a configuration of a remote control system for an autonomous vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 9.

FIG. 1 illustrates a block diagram showing a configuration of a remote control system for an autonomous vehicle according to an exemplary embodiment of the present disclosure.

Referring to FIG. 1, the remote control system for the autonomous vehicle according to an exemplary embodiment of the present disclosure includes a vehicle 100 and a control system 200, and remote control may be performed through communication between the vehicle 100 and the control system 200. In this case, the vehicle 100 may include an autonomous vehicle.

The vehicle 100 may include an autonomous driving control apparatus 120, a sensing device 120, a steering control apparatus 130, a braking control apparatus 140, and an engine control apparatus 150.

The autonomous driving control apparatus 110 according to the exemplary embodiment of the present disclosure may be implemented inside the vehicle. In this case, the autonomous driving control apparatus 110 may be integrally formed with internal control units of the vehicle, or may be implemented as a separate device to be connected to control units of the vehicle by a separate connection device.

When an emergency occurs in the vehicle during autonomous driving, the autonomous driving control apparatus 110 may transmit an emergency request message for notifying that the emergency has occurred to the control system 200 and requesting help. As provided herein, an occupant of the autonomous vehicle who is suffering from the emergency is referred to as an "emergency patient." Accordingly, the autonomous driving control apparatus 110 may control the vehicle to follow a path having a shortest estimated time required for movement among a contact path for contact with an ambulance (i.e., a path to reach the ambulance), a path to a hospital, or a path for contact with a neighboring vehicle (i.e., a path to reach an adjacent or nearby vehicle) that may be able to provide assistance, e.g., first aid. In this case, the emergency patient may include all occupants on the vehicle, such as a driver and/or passengers.

Referring to FIG. 1, the autonomous driving control apparatus 110 may include a communication device 111, a storage 112, an interface device 113, and a processor 114.

The communication device 111 is a hardware device implemented with various electronic circuits to transmit and receive signals through a wireless or wired connection, and may transmit and receive information based on in-vehicle devices and in-vehicle network communication techniques. For example, the in-vehicle network communication techniques may include controller area network (CAN) communication, local interconnect network (LIN) communication, flex-ray communication, Ethernet communication, and the like.

In addition, the communication device 111 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like. For example, the communication device 111 may perform wireless communication with the control system 200, may transmit a condition of the emergency patient (e.g., a driver and/or a vehicle occupant), vehicle position information (e.g., vehicle coordinates), neighboring vehicle information, etc. to the control system 200, and may request remote control to quickly escort an emergency patient to a hospital. In addition, the communication device 111 may receive a driving path for the emergency patient to an ambulance, a hospital, and an aid vehicle (a vehicle of an occupant capable of first aid), a remote control command, and the like from the control system 200.

The storage 112 may store sensing results of the sensing device 120, information received from the control system 200, data and/or algorithms required for the processor 114 to operate, and the like. For example, the storage 112 may store vehicle information, a vehicle driving path, map information, and a remote control command received from the control system 200.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input device for receiving a control command from a user and an output device for outputting an operation state of the autonomous driving control apparatus 110 and results thereof. Herein, the input device may include a key button, and may further include a mouse, a keyboard, a touch screen, a microphone, a joystick, a jog shuttle, a stylus pen, and the like. In addition, the input device may further include a soft key implemented on the display.

The interface device 113 may be implemented as a head-up display (HUD), a cluster, an audio video navigation (AVN), a human machine interface (HM), a user setting menu (USM), or the like.

For example, the interface device 113 may display data transmitted and received with respect to the control system 200, a driving path of the vehicle, a remote control command or a driving path received from the control system 200, and the like.

The output device may include a display, and may further include a voice output device such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 114 may be electrically connected to the communication device 111, the storage 112, the interface device 113, and the like, may electrically control each component, and may be an electrical circuit that executes software commands, thereby performing various data processing and calculations described below.

The processor 114 may process a signal transferred between components of the autonomous driving control apparatus 110, and may perform overall control such that each of the components can perform its function normally.

The processor 114 may be implemented in the form of hardware, software, or a combination of hardware and software, or may be implemented as microprocessor, and may be, e.g., an electronic control unit (ECU), a micro controller unit (MCU), or other subcontrollers mounted in the vehicle.

The processor 114 may determine whether an emergency has occurred in an autonomous vehicle. The processor 114 may automatically request assistance, such as remote control, from the control system 200 through the communication device 111 when a response is required due to occurrence of the emergency to an emergency patient in the vehicle.

Emergencies may include life-threatening conditions such as heart attack, fainting, and stroke, making it impossible to drive.

In this case, the processor 114 may determine an emergency situation based on biometric information such as a heart rate and a respiration rate of an occupant detected by the sensing device 120, eye movement, head movement, posture information, and the like. In addition, the processor 114 may determine the emergency situation by a direct request of the occupant. For example, the processor 114 may determine the emergency situation when an emergency button is pressed by an occupant.

The processor 114 may transmit an emergency request message for requesting help due to occurrence of the emergency by an emergency patient to the control system 200 through the communication device 111. The processor 114 may transmit a condition of the emergency patient, vehicle position information, neighboring vehicle information, and the like to the control system 200 through the communication device 111.

The processor 114 may follow and control a contact path with an ambulance, a contact path with a neighboring vehicle (vehicle capable of help) with an occupants capable of first aid, etc., a travel path to a hospital, and the like.

The sensing device 120 may detect an emergency situation of a vehicle occupant, such as a driver. The sensing device 120 may sense a heart rate, a respiration rate, eye movement, posture information, and the like of the occupant to determine the emergency situation. Accordingly, the processor 114 may determine the emergency situation based on a heart rate, a respiration rate, eye movement, posture information of an occupant detected by the sensing device 120, and the like. In this case, the processor 114 may determine the emergency situation by a request of the occupant. For example, the processor 114 may determine the emergency situation when an emergency button is pressed by an occupant.

In addition, the sensing device 120 may include one or more sensors that sense an obstacle, e.g., a preceding vehicle, positioned around the host vehicle and measure a distance with the obstacle and/or a relative speed thereof.

The sensing device 120 may include a plurality of sensors to detect an occupant inside the vehicle or an object outside the vehicle. To this end, the sensing device 120 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, etc.

Figure 2A:
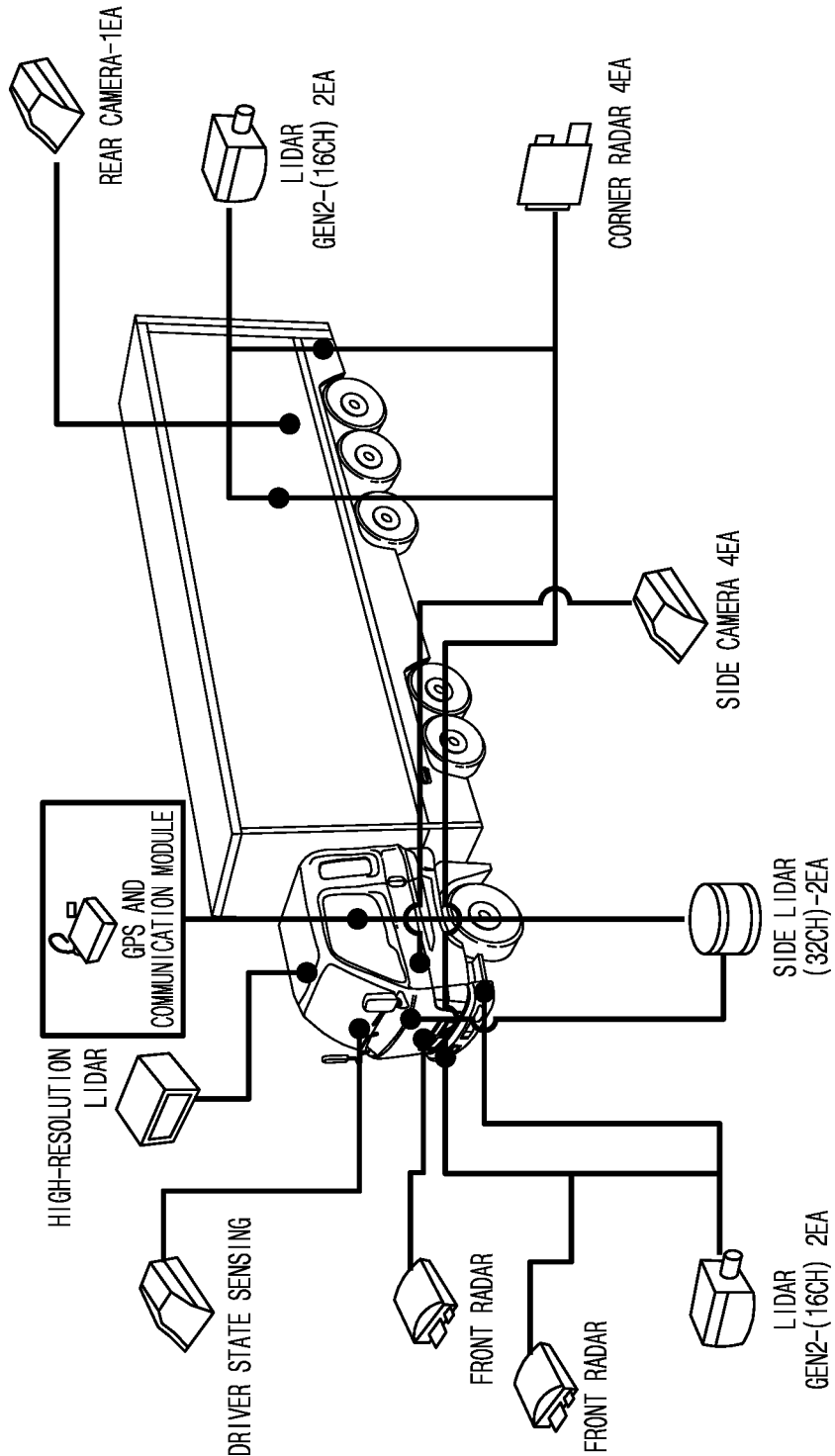
FIG. 2A illustrates a view for describing a sensing device of an autonomous vehicle according to an exemplary embodiment of the present disclosure.
Figure 2B:
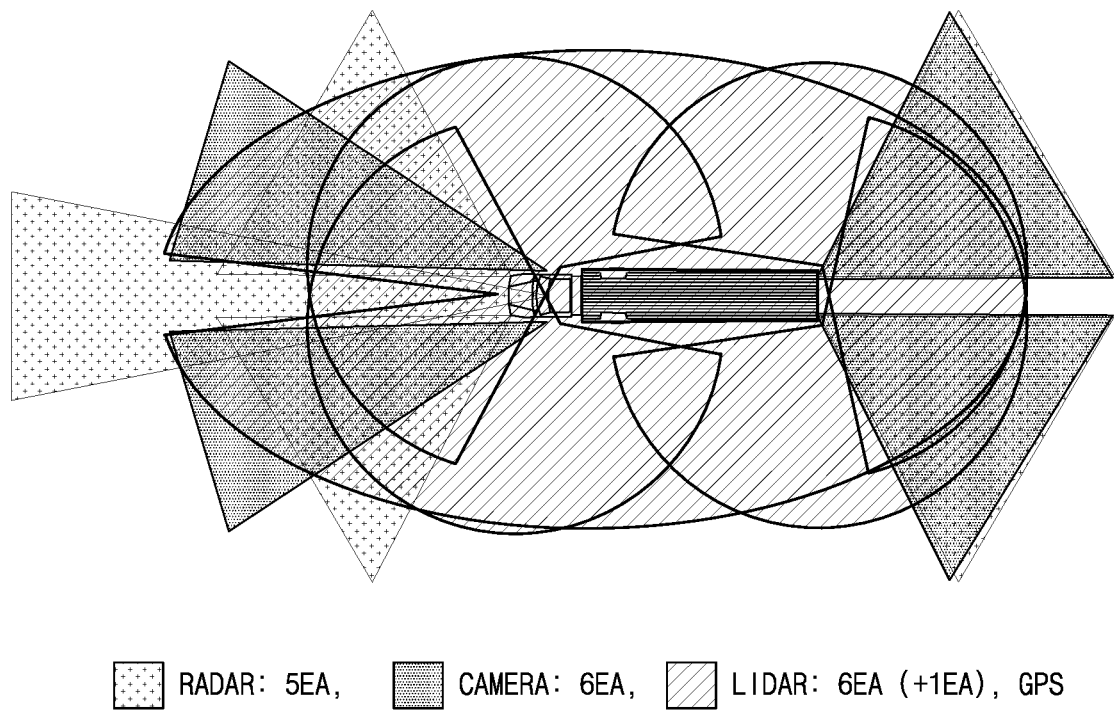
FIG. 2B illustrates a sensing range of a sensing device of an autonomous vehicle according to an exemplary embodiment of the present disclosure.

FIG. 2A illustrates a view for describing a sensing device of an autonomous vehicle according to an exemplary embodiment of the present disclosure, and FIG. 2B illustrates a sensing range of a sensing device of an autonomous vehicle according to an exemplary embodiment of the present disclosure.

Referring to FIG. 2A, the sensing device 120 may include a front radar mounted on the front of the vehicle, a lidar, a side lidar, a side camera, a corner radar, a high-resolution lidar, a rear camera, a rear lidar, etc. In addition, referring to FIG. 2B, an interior situation or a neighboring situation of the vehicle may be detected through radars, cameras, and lidars of the front, rear, and side of the vehicle. In particular, a situation of an occupant (e.g., a driver) inside the vehicle may be detected by using an indoor camera.

The steering control device 130 may be configured to control a steering angle of a vehicle, and may include a steering wheel, an actuator interlocked with the steering wheel, and a controller controlling the actuator.

The braking control device 140 may be configured to control braking of the vehicle, and may include a controller that controls a brake thereof.

The engine control device 150 may be configured to control engine driving of a vehicle, and may include a controller that controls a speed of the vehicle.

When receiving an emergency request message for requesting help depending on occurrence of an emergency to an emergency patient from the autonomous vehicle 100, the control system 200 may generate a contact with an ambulance, a driving path for direct transport to a hospital, a contact path with a vehicle capable of neighboring assistance, and the like. In addition, the control system 200 may perform remote control such that the vehicle 100 travels along a fastest path for treating an emergency patient among the generated paths.

The control system 200 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques. For example, the in-vehicle network communication techniques may include controller area network (CAN) communication, local interconnect network (LIN) communication, flex-ray communication, Ethernet communication, and the like.

In addition, the communication device 211 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like. For example, the communication device 211 may perform wireless communication with the vehicle 100, may receive the emergency request message from the vehicle 100, and may transmit a remote control command or path to the vehicle 100.

The storage 212 may store vehicle data received from the vehicle 100, and data and/or algorithm required for the processor 214 to operate, and the like. For example, the storage 212 may store vehicle position information received from the vehicle 100, emergency patient condition information, and the like.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input device capable of receiving a control command from an operator and an output device for outputting an operation state of the control system 200 and results thereof. Herein, the input device may include a key button, and may further include a mouse, a keyboard, a touch screen, a microphone, a joystick, a jog shuttle, a stylus pen, and the like. In addition, the input device may further include a soft key implemented on the display. For example, the interface device 213 may display map information in which a driving path of the vehicle, a current position of the vehicle, information related to neighboring objects, etc. are marked based on vehicle data received from the vehicle 100. For example, the interface device 213 may include a personal computer (PC), a notebook computer, a tablet, and the like.

The output device may include a display, and may further include a voice output device such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 214 may be electrically connected to the communication device 211, the storage 212, the interface device 213, and the like, may electrically control each component, and may be an electrical circuit that executes software commands, thereby performing various data processing and calculations described below.

The processor 214 may process a signal transferred between components of the control system 200, and may perform overall control such that each of the components can perform its function normally. The processor 214 may be implemented in the form of hardware, software, or a combination of hardware and software, or may be implemented as microprocessor.

When receiving the emergency request message from the autonomous vehicle 100, the processor 214 may request an ambulance from a current position of the autonomous vehicle 100 to a nearest hospital.

In addition, the processor 214 may generate a path for the autonomous vehicle 100 to make contact with an ambulance, a path for the autonomous vehicle 100 to make contact with a neighboring vehicle capable of providing first aid, and a movement path to a hospital, may calculate an estimated time required for each of the paths to select a path with a shortest estimated time, and may remotely control the autonomous vehicle 100 to follow the selected shortest path.

The processor 214 may generate at least one of a path for the autonomous vehicle 100 to make contact with an ambulance, a path for the autonomous vehicle 100 to make contact with a neighboring vehicle capable of first aid, and a travel path of the autonomous vehicle 100 to a hospital based on a traffic condition.

The processor 214 may mark a current position of the autonomous vehicle, neighboring object information, and a vehicle path on the map to display it on the screen through the interface device 213. The processor 214 may receive vehicle position information, vehicle neighboring image information, and vehicle neighboring information from the vehicle 100 requesting assistance due to occurrence of an emergency to an emergency patient.

The processor 214 may remotely control the autonomous vehicle 100 by selecting a path with a short estimated time required among a path for the autonomous vehicle 100 to make contact with an ambulance or a path for the autonomous vehicle 100 to travel to a hospital.

The processor 214 may transmit an emergency request message to a neighboring vehicle corresponding to at least one of within the selected path, within a predetermined range from the selected path, or within a predetermined range from a current position of the autonomous vehicle 100.

The processor 214 may receive the presence of an occupant capable of cardiopulmonary resuscitation (CPR) or first aid from a neighboring vehicle that has received the emergency request message, and when there is a neighboring vehicle with the occupant capable of CPR or first aid, may generate a path for the neighboring vehicle to join the path of the autonomous vehicle 100.

In this case, the processor 214 may calculate and compare estimated times of the selected path and the path for the neighboring vehicle to join the path of the autonomous vehicle 100, and when the estimated time of the selected route is equal to or shorter than that of the path for the neighboring vehicle to join the path of the autonomous vehicle 100, the processor 214 may remotely control the autonomous vehicle 100 to follow and control the selected path.

When the estimated time of the selected path is longer than that of the path for the neighboring vehicle to join the path of the autonomous vehicle 100, the processor 214 may transmit the path for the neighboring vehicle to join the path of the autonomous vehicle to the neighboring vehicle.

The processor 214 may receive whether it is possible to perform joining from the neighboring vehicle. Accordingly, the processor 214 may remotely control the autonomous vehicle 100 to make contact with the neighboring vehicle when the neighboring vehicle can join the path for joining, and may remotely control the autonomous vehicle 100 to follow the selected path when emergency treatment of an emergency patient of the autonomous vehicle 100 is completed by the occupant of the neighboring vehicle.

Meanwhile, the processor 214 may remotely control the autonomous vehicle 100 to follow the selected path when it is impossible to join the path for the neighboring vehicle to join it.

Figure 3:
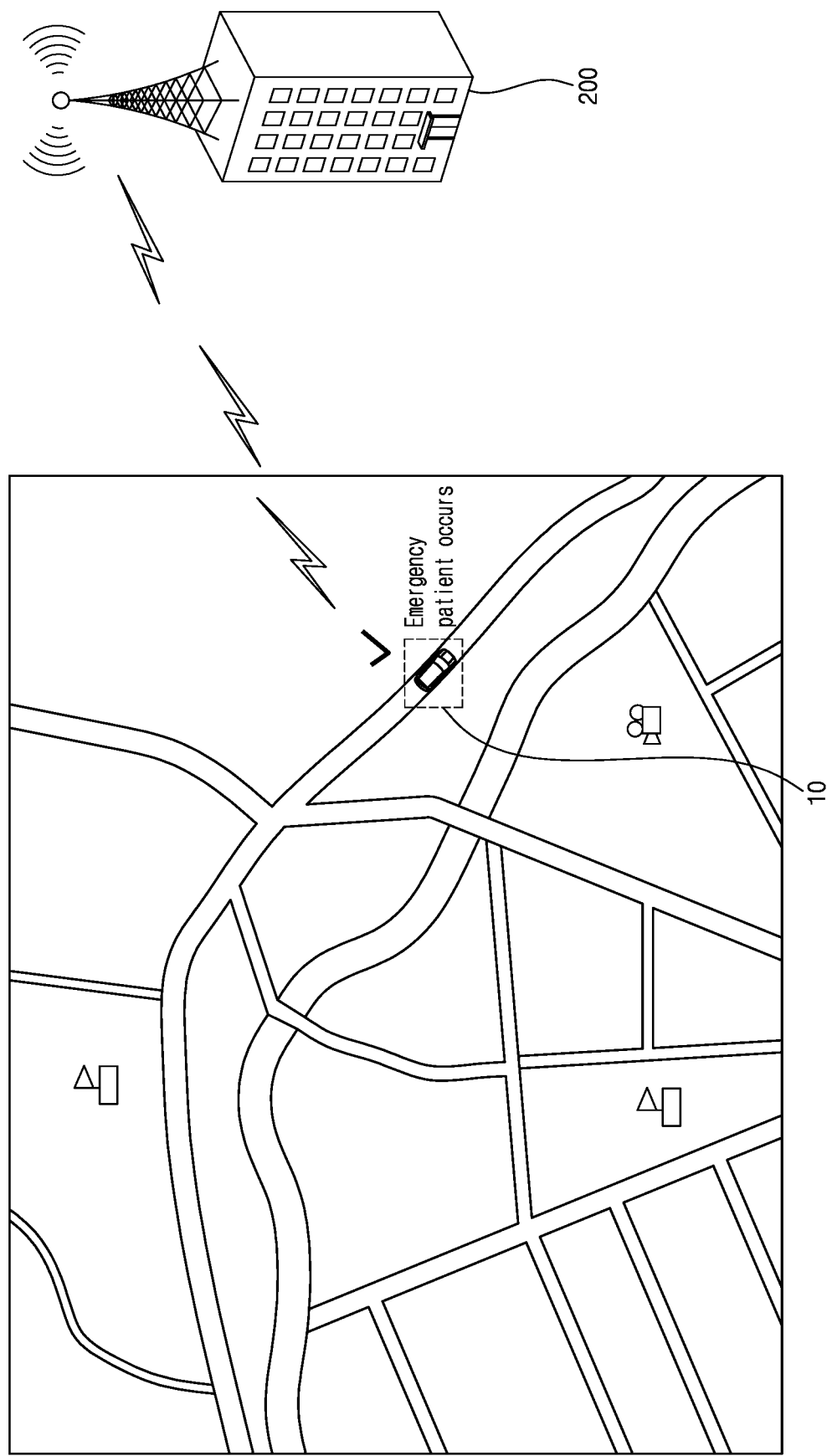
FIG. 3 to FIG. 5 each illustrate an example of a screen of a response situation when an emergency occurs during autonomous driving according to an exemplary embodiment of the present disclosure.
Figure 4:
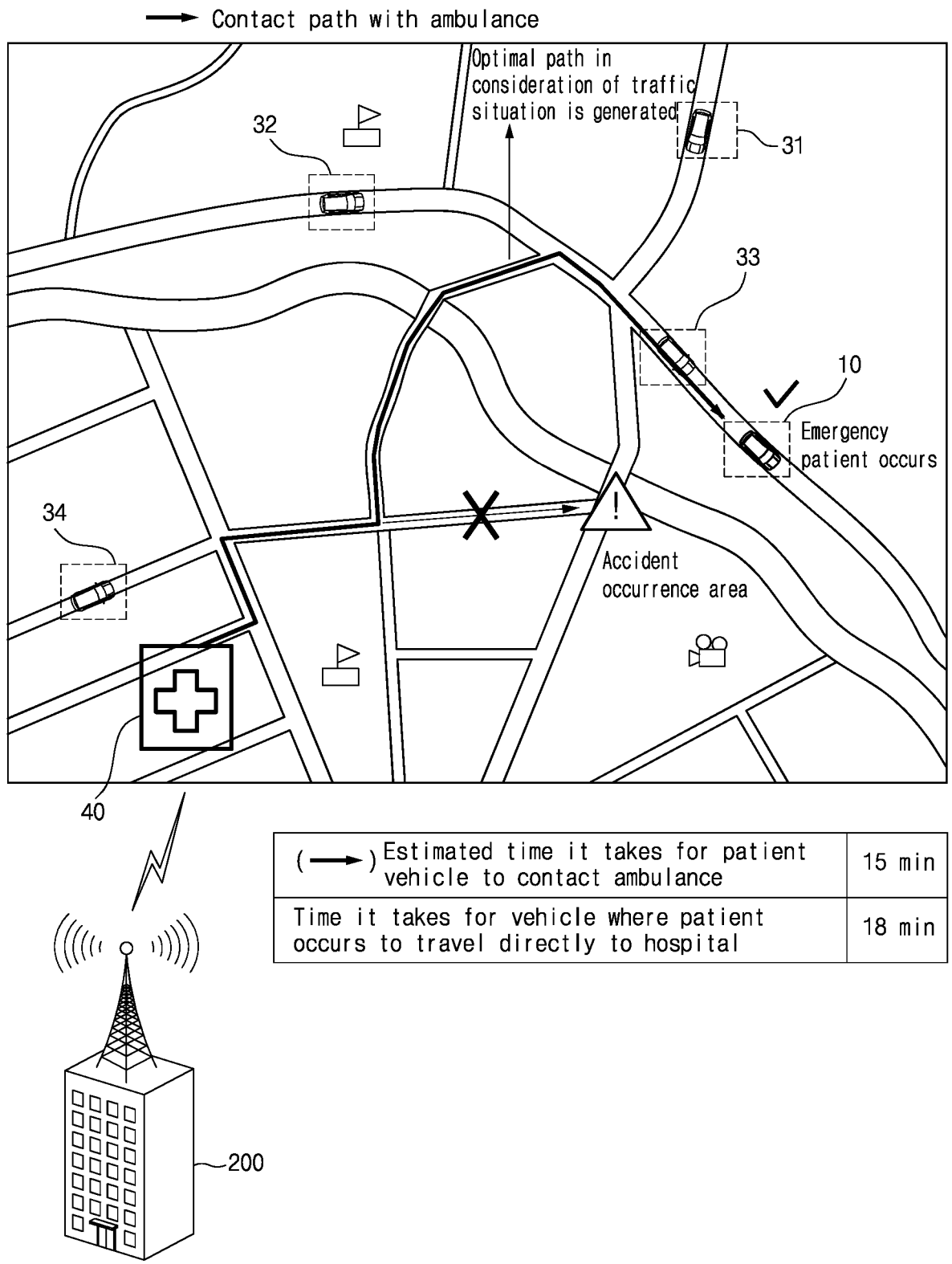
Figure 5:
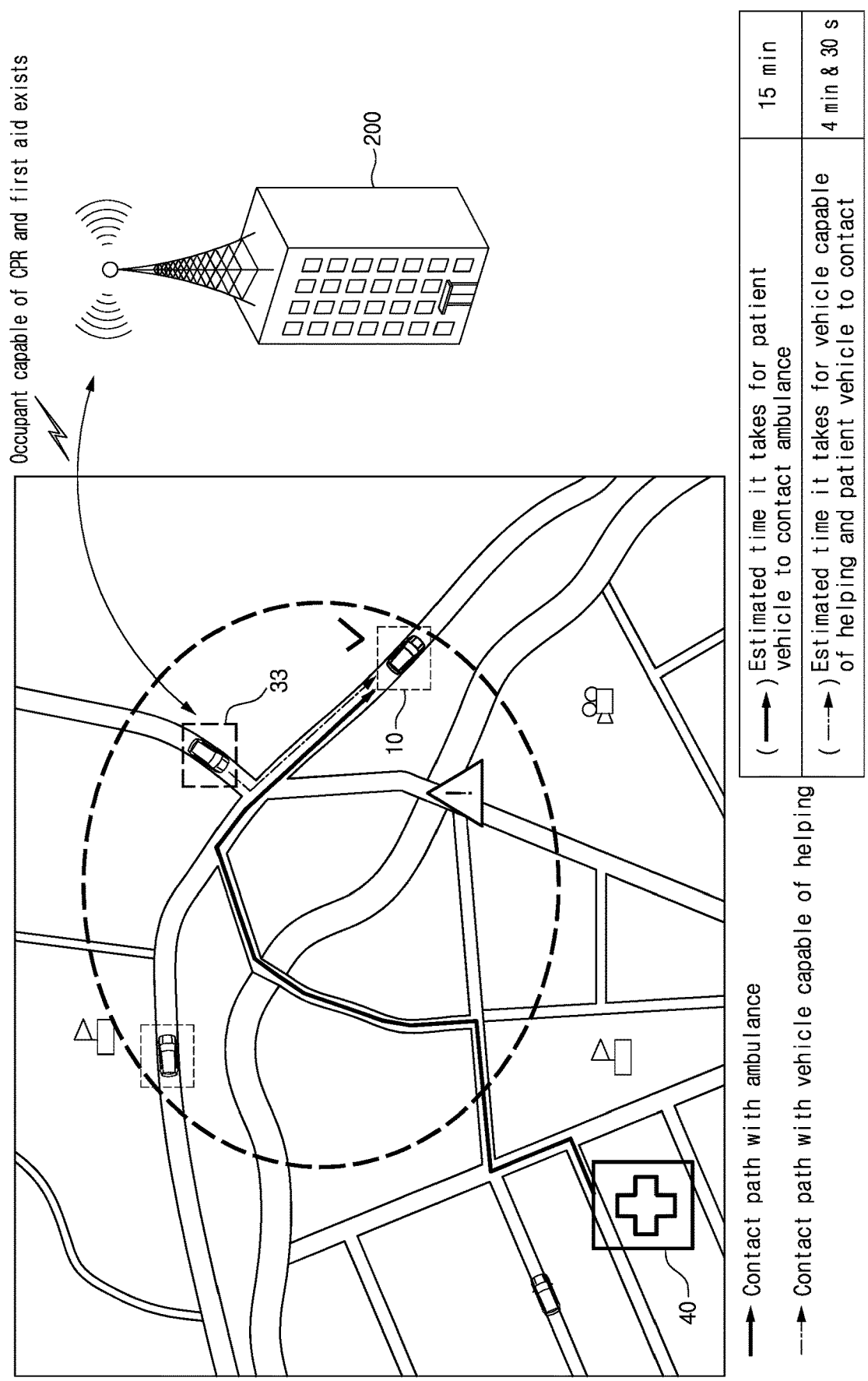

FIG. 3 to FIG. 5 each illustrate an example of a screen of a response situation when an emergency occurs during autonomous driving according to an exemplary embodiment of the present disclosure.

Referring to FIG. 3, when an emergency occurs to an emergency patient during autonomous driving, a vehicle 10 automatically transmits an emergency request message to the control system 200. In this case, the vehicle 10 may transmit a condition of the emergency patient and vehicle position information to the control system 200 together.

Accordingly, the control system 200 may mark a position of the vehicle 10 requesting assistance due to the emergency patient on the map such that a controller can check it.

Then, the control system 200 may request an ambulance to a nearest hospital from a current position of the vehicle 10, may generate an expected path for the vehicle 10 to make contact with the ambulance, and may calculate an estimated time it takes to contact the ambulance. In addition, when the vehicle 10 moves directly to the hospital, the expected path and the estimated time may be calculated. In this case, the vehicle 10 may generate the expected path in consideration of a surrounding traffic condition. Accordingly, the control system 200 may compare an estimated time of a path when the vehicle 10 makes contact with the ambulance and an estimated time of a path when it travels directly to a hospital, may select an expected path with a shorter expected time, and may perform remote control such that the vehicle 10 to travel thereby.

For example, in the case where the estimated time it takes for the vehicle 10 to travel to a hospital 40 is 18 min as shown in FIG. 4, when an ambulance is requested from the hospital 40 to contact it at a midpoint, an estimated time it takes for the vehicle 10 to make contact with the ambulance may be further reduced to 15 min. As a result, the emergency patient may receive emergency treatment more quickly.

In addition, the control system 200 may transmit an emergency request message to a neighboring vehicle of the vehicle 10 in which the emergency has occurred, and may request to check whether there is an occupant capable of cardiopulmonary resuscitation and first aid. In this case, a vehicle in at least one range of within an expected path for making contact with the ambulance, within a predetermined range from the expected path for making contact with the ambulance, or within a predetermined range from a position of the vehicle 10 in which the emergency occurred may be designated as a neighboring vehicle.

As illustrated in FIG. 4, when vehicles 31, 32, 33, and 34 exist around the vehicle 10 on a map, the vehicles 32 and 33 within a predetermined range from the vehicle 10 may be designated as neighboring vehicles. FIG. 5 illustrates an example in which there is an occupant capable of cardiopulmonary resuscitation and first aid in the neighboring vehicle 33. The vehicle 10 may calculate an expected time for the neighboring vehicle 33 (a vehicle capable of helping) to make contact with the vehicle 10 in which the emergency has occurred, to compare it with an expected time for the vehicle 10 in which the emergency has occurred to contact with the ambulance.

Referring to FIG. 5, the control system 200 may generate a contact path with the neighboring vehicle 33 in which there is the occupant capable of cardiopulmonary resuscitation and first aid to calculate an estimated time taken to contact it, and may remotely control the vehicle to travel on a path with a shorter estimated time by comparing it to an estimated time it takes to make contact with the ambulance.

For example, when the estimated time it takes for the vehicle 10 to make contact with the ambulance is 15 min, but the estimated time required to make contact with the neighboring vehicle 33 (vehicle capable of helping) with the occupant capable of CPR and first aid is 4 min and 30 s, the control system 200 may perform remote control such that the vehicle 10 is in contact with the vehicle 33 capable of helping. In this case, the control system 200 may transmit the expected path for contacting the vehicle 10 to the vehicle 33 capable of helping, and the vehicle 33 capable of helping may determine whether it is possible to join the received expected path to transmit it to the control system 200.

The vehicle 10 may make contact with the vehicle 33 capable of helping to receive the cardiopulmonary resuscitation and the first aid for the emergency patient, and then the control system 200 may remotely control the vehicle 10 to travel along the contact path with the ambulance or to travel directly to a hospital.

As such, according to the present disclosure, when an emergency occurs to an emergency patient during autonomous driving, it is possible to make contact with an ambulance to use it and to transport the emergency patient or it is possible to secure golden time for the emergency patient based on information from a neighboring vehicle (e.g., whether there is an occupant capable of first aid, whether they have joined, etc.), thereby increasing a survival probability of the emergency patient by shortening the transport time to a hospital, instead of simply moving the vehicle to the hospital or a pre-designated position through remote control.

Figure 6:
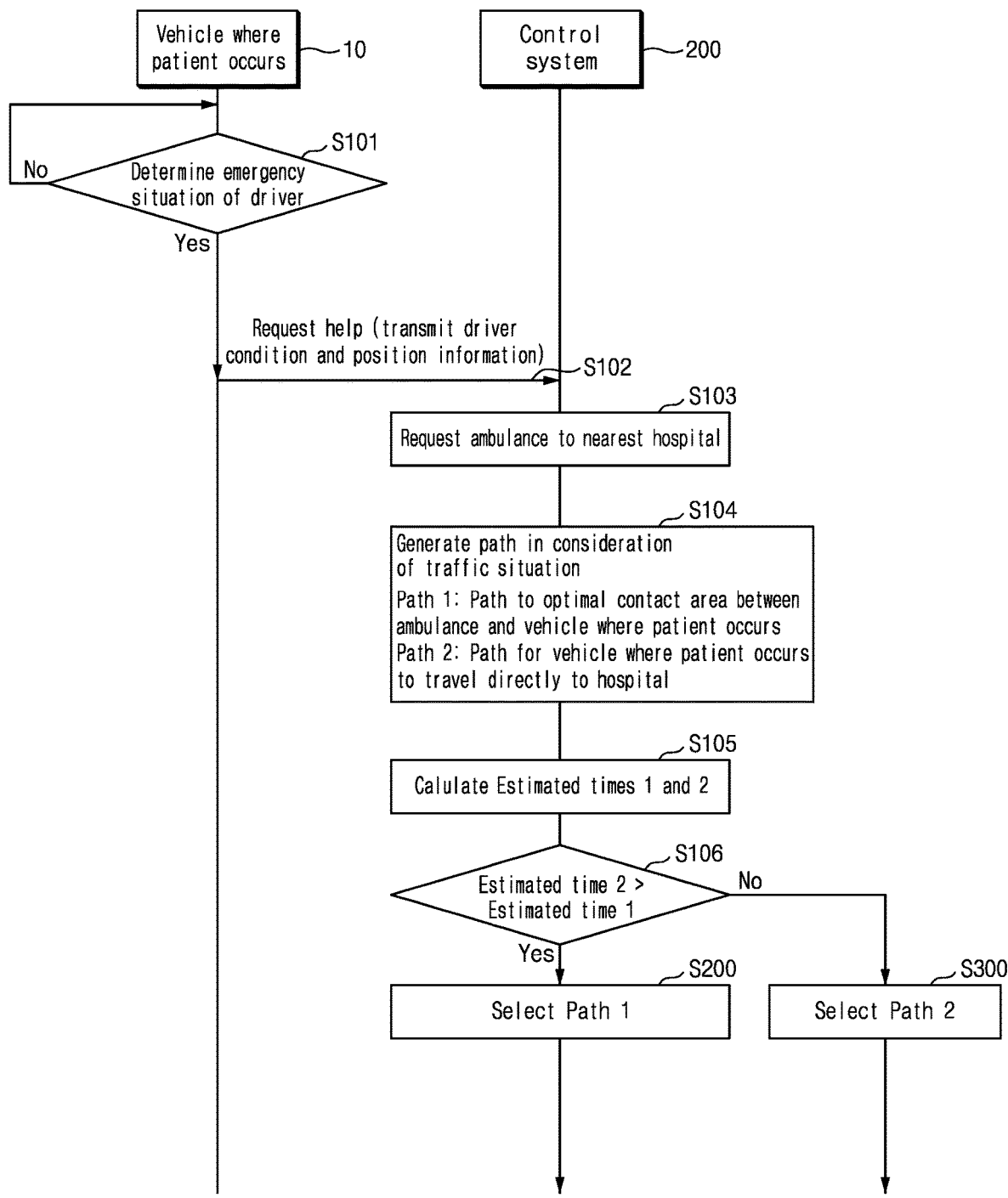
FIG. 6 to FIG. 8 each illustrates a flowchart showing a remote control method for an autonomous vehicle when an emergency occurs according to an exemplary embodiment of the present disclosure.
Figure 7:
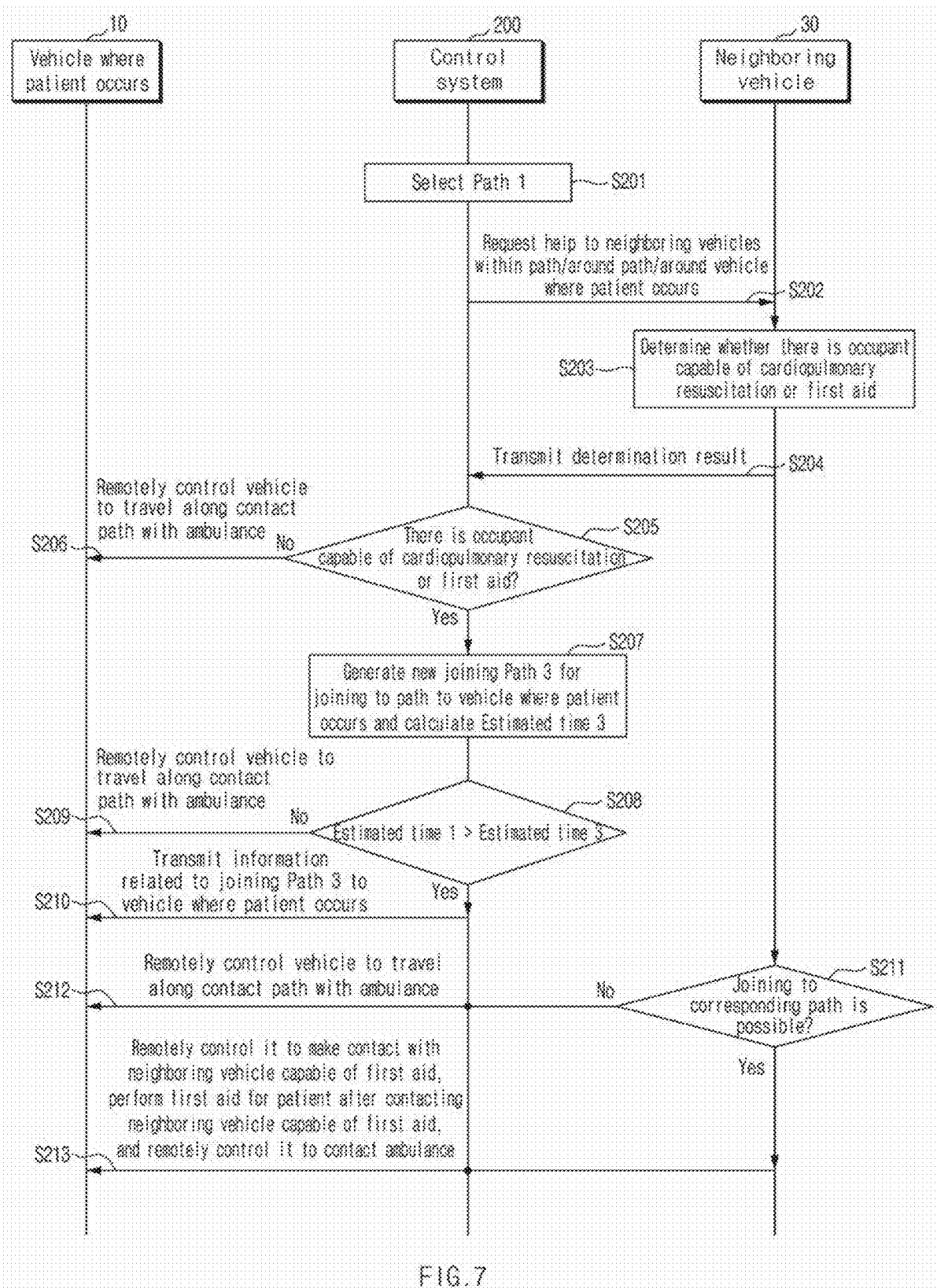
Figure 8:
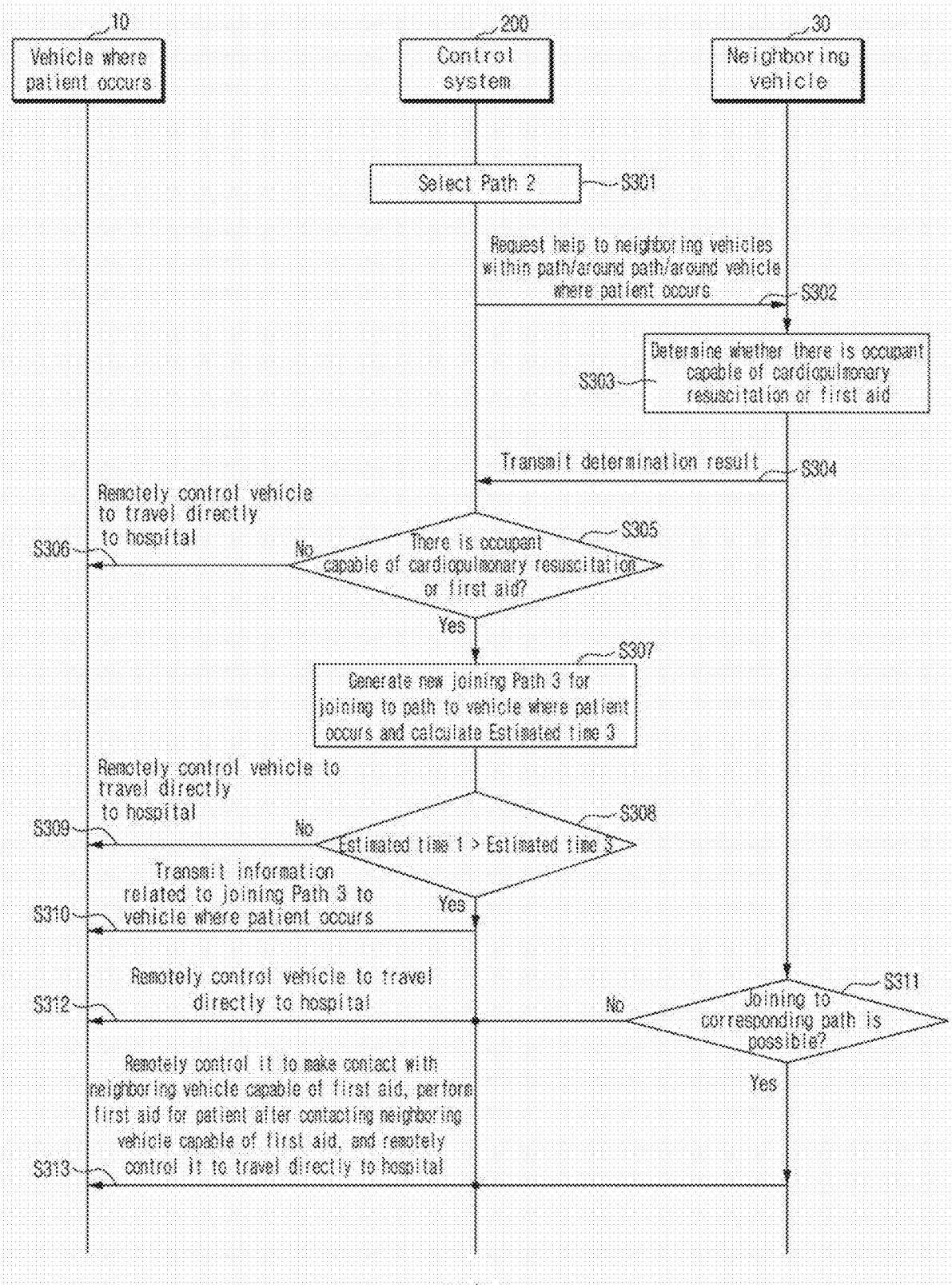

Hereinafter, a remote control method for an autonomous vehicle when an emergency occurs according to an exemplary embodiment of the present disclosure will be described in detail with reference to FIG. 6 to FIG. 8. FIG. 6 to FIG. 8 each illustrates a flowchart showing a remote control method for an autonomous vehicle when an emergency occurs according to an exemplary embodiment of the present disclosure.

Hereinafter, it is assumed that the autonomous driving control apparatus 110 of the vehicle 100 of FIG. 1 and the control system 200 perform processes of FIG. 6 to FIG. 8. In addition, in the description of FIG. 6 to FIG. 8, it may be understood that operations described as being performed by each system are controlled by a processor of each of the systems.

Referring to FIG. 6, a vehicle 10 in which a patient occurs may determine an emergency situation of a driver during autonomous driving (S101).

Then, the vehicle 10 in which the patient has occurred automatically transmits an emergency request message to the control system 200 (S102). In this case, the vehicle 10 in which the patient has occurred may transmit driver condition information and vehicle position information together to the control system 200.

The control system 200 automatically requests an ambulance to a nearest hospital from the current position of the vehicle 10 in which the patient has occurred (S103), and generates a path Path 1 to an optimal contact area between the ambulance and the vehicle 10 in which the patient has occurred and a path Path 2 in which the vehicle 10 in which the patient has occurred directly travels to a hospital in consideration of a traffic situation (S104).

Next, the control system 200 calculates Expected time 1 and Expected time 2 of each of the paths Path 1 and Path 2 (S105), and compares the Expected time 2 with the Expected time 1 (S106).

The control system 200 selects the path Path 1 when the Expected time 2 is greater than the Expected time 1 (S200), and selects the path Path 2 when the Expected time 2 is smaller than or equal to the Expected time 1 (S300).

Next, a process of S200 will be described in detail with reference to FIG. 7. When the path 1 is selected (S201), the control system 200 may transmit an emergency request message to neighboring vehicles within the path, around the path, and within a predetermined range from the vehicle 10 in which the patient has occurred (S202).

Accordingly, a neighboring vehicle 30 receiving the emergency request message may determine whether there is an occupant capable of cardiopulmonary resuscitation or first aid (S203), and may transmit a determination result thereof to the control system 200 (S204). The neighboring vehicle 30 may search pre-stored driver information (e.g., occupation (doctor), etc.) to determine whether there is an occupant capable of cardiopulmonary resuscitation or first aid. In addition, the neighboring vehicle 30 may display the emergency request message on a screen so that the occupant of the vehicle 30 can respond to whether cardiopulmonary resuscitation or first aid is possible after checking it.

The control system 200 recognizes whether there is a neighboring vehicle in which there is an occupant capable of cardiopulmonary resuscitation or first aid based on the received determination result (S205), and performs remote control such that the vehicle 10 in which the patient has occurred travels to the contact path Path 1 of the ambulance when there is no occupant capable of cardiopulmonary resuscitation or first aid (S206).

On the other hand, when there is the occupant capable of cardiopulmonary resuscitation or first aid, the control system 200 may generate a new joining path Path 3 for the neighboring vehicle 30 in which there is the occupant capable of cardiopulmonary resuscitation or first aid to join the path of the vehicle 10 in which the patient has occurred, and may calculate Expected time 3 for the joining path Path 3 (S207).

The control system 200 compares the Expected time 1 for the path Path 1 with the Expected time 3 for the path Path 3 (S208), and when the Expected time 1 is smaller than or equal to the Expected time 3, performs remote control such that the vehicle 10 in which the patient has occurred travels along the contact path Path 1 of the ambulance (S209).

On the other hand, when the Expected time 1 is greater than the Expected time 3, the path Path 3 is transmitted to the vehicle 10 in which the patient has occurred (S210), and the neighboring vehicle 30 determines whether it is possible to join the received path Path 3 (S211).

Accordingly, when the neighboring vehicle 30 is unable to join it, this impossibility is transmitted to the control system 200, and the control system 200 performs remote control such that the vehicle 10 travels along the contact path with the ambulance (S212).

On the other hand, when the neighboring vehicle 30 is able to join it, this joining possibility is transmitted to the control system 200, and the control system 200 performs remote control such that it makes contact with the neighboring vehicle 30, when the first aid of the emergency patient is completed by the occupant of the neighboring vehicle 30, performs remote control such that the vehicle 10 travels again along the contact path with the ambulance (S213).

Next, a process of S300 will be described in detail with reference to FIG. 8.

When the path 2 is selected (S301), the control system 200 may transmit an emergency request message to neighboring vehicles within the path around the path, and within a predetermined range from the vehicle 10 in which the patient has occurred (S302).

Accordingly, a neighboring vehicle 30 receiving the emergency request message may determine whether there is an occupant capable of cardiopulmonary resuscitation or first aid (S303), and may transmit a determination result thereof to the control system 200 (S304). The neighboring vehicle 30 may search pre-stored driver information (e.g., occupation (doctor), etc.) to determine whether there is an occupant capable of cardiopulmonary resuscitation or first aid. In addition, the neighboring vehicle 30 may display the emergency request message on a screen so that the occupant of the vehicle 30 can respond to whether cardiopulmonary resuscitation or first aid is possible after checking it.

The control system 200 recognizes whether there is a neighboring vehicle in which there is an occupant capable of cardiopulmonary resuscitation or first aid based on the received determination result (S305), and performs remote control such that the vehicle 10 in which the patient has occurred travels to the contact path Path 1 of the ambulance when there is no occupant capable of cardiopulmonary resuscitation or first aid (S306).

On the other hand, when there is the occupant capable of cardiopulmonary resuscitation or first aid, the control system 200 may generate a new joining path Path 3 for the neighboring vehicle 30 in which there is the occupant capable of cardiopulmonary resuscitation or first aid to join the path of the vehicle 10 in which the patient has occurred, and may calculate Expected time 3 for the joining path Path 3 (S307).

The control system 200 compares the Expected time 2 for the path Path 2 with the Expected time 3 for the path Path 3 (S308), and when the Expected time 2 is smaller than or equal to the Expected time 3, performs remote control such that the vehicle 10 in which the patient has occurred travels directly to a hospital (S309).

On the other hand, when the Expected time 2 is greater than the Expected time 3, the path Path 3 is transmitted to the vehicle 10 in which the patient has occurred (S310), and the neighboring vehicle 30 determines whether it is possible to join the received path Path 3 (S311).

Accordingly, when the neighboring vehicle 30 is unable to join it, this impossibility is transmitted to the control system 200, and the control system 200 performs remote control such that the vehicle 10 travels directly to a hospital (S312).

On the other hand, when the neighboring vehicle 30 is able to join it, this possibility is transmitted to the control system, the control system 200 remotely controls the vehicle 10 to make contact with the neighboring vehicle 30, and performs remote control such that the vehicle 10 travels to a hospital (S313) when the first aid of the emergency patient is completed with help of the occupant of the neighboring vehicle 30.

As such, according to the present disclosure, it is possible to increase a survival probability of an occupant such as a driver by treating and transporting the occupant in a safest and fastest way in consideration of surrounding vehicle information (whether there is an occupant capable of CPR and first aid, and whether joining is possible), a position and a path of an ambulance, expected arrival times of the ambulance and/or a neighboring vehicle capable of helping, and the like.

Figure 9:
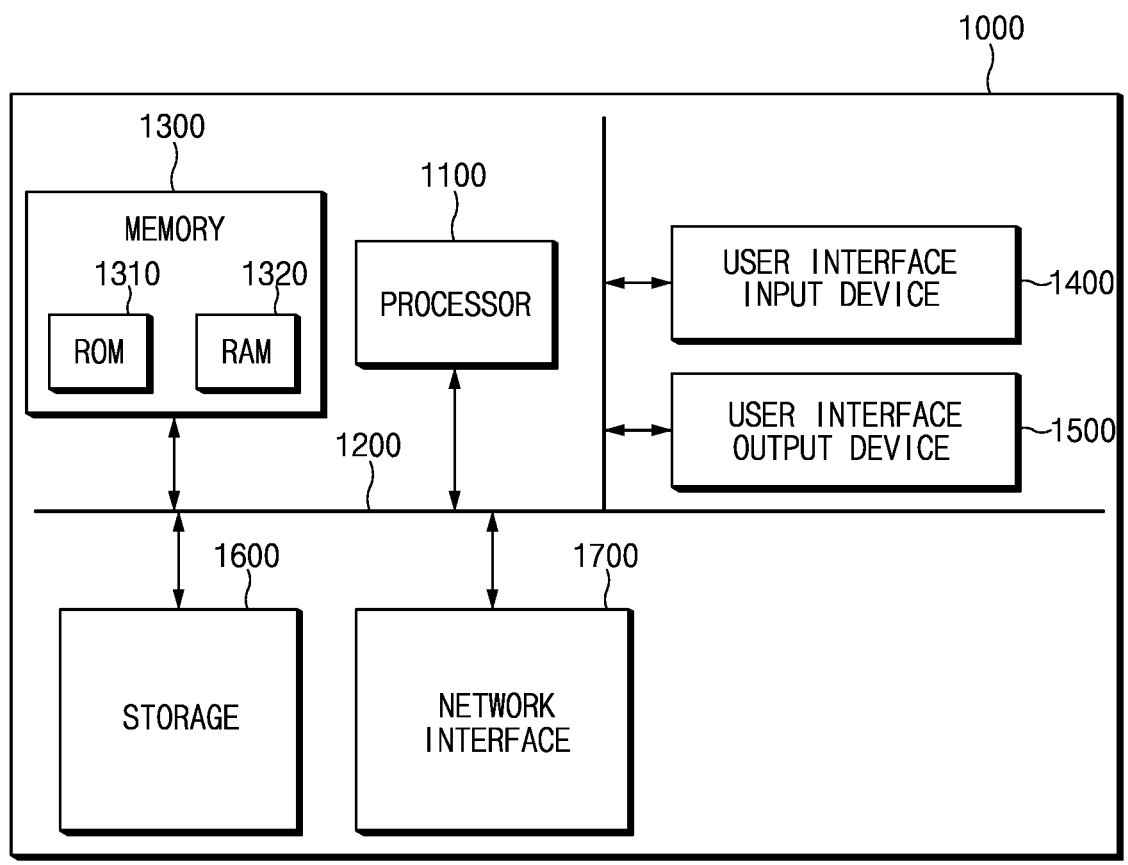
FIG. 9 illustrates a computing system according to an exemplary embodiment of the present disclosure.

FIG. 9 illustrates a computing system according to an exemplary embodiment of the present disclosure.

Referring to FIG. 9, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A control system, comprising:
   a processor configured to:
      request an ambulance to travel to a nearest hospital when receiving an emergency request message from an autonomous vehicle,
      select a path with a shortest estimated required time among a path for the autonomous vehicle to physically meet the ambulance, and a path for the autonomous vehicle to travel to the hospital, and
      remotely control the autonomous vehicle by the path with the shortest estimated required time,
   wherein the processor, when the path for the autonomous vehicle to physically meet the ambulance is selected or the path for the autonomous vehicle to travel to the hospital is selected, transmits the emergency request message to a neighboring vehicle,
   wherein the processor generates a path for the neighboring vehicle to join a path of the autonomous vehicle in response to receiving a message indicating that the neighboring vehicle has an occupant capable of performing cardiopulmonary resuscitation or first aid,
   wherein the processor calculates estimated times of the selected path and the path for the neighboring vehicle to join the path of the autonomous vehicle to compare them,
   wherein the processor, when the estimated time of the selected path is longer than the estimated time of the path for the neighboring vehicle to join the path of the autonomous vehicle, transmits the path for the neighboring vehicle to join the path of the autonomous vehicle to the neighboring vehicle, and
   wherein the neighboring vehicle is located within a predetermined range from the path for the autonomous vehicle to physically meet the ambulance, within a predetermined range from the path for the autonomous vehicle to travel to the hospital, or within a predetermined range from a current position of the autonomous vehicle.

2. The control system of claim 1, wherein the processor generates at least one of the path for the autonomous vehicle to physically meet the ambulance, or the path for the autonomous vehicle to travel to the hospital, based on a traffic situation.

3. The control system of claim 1, wherein the processor transmits the emergency request message to a plurality of neighboring vehicles.

4. The control system of claim 3, wherein the processor is configured to receive a message containing information about whether there is the occupant of the neighboring vehicle capable of performing cardiopulmonary resuscitation or first aid from the neighboring vehicle that has received the emergency request message.

5. The control system of claim 4, wherein the processor, when the estimated time of the selected path is equal to or shorter than the estimated time of the path for the neighboring vehicle to join the path of the autonomous vehicle, remotely controls the autonomous vehicle to follow the selected path.

6. The control system of claim 4, wherein the processor is configured to receive information on whether the neighboring vehicle is able to join the path of the autonomous vehicle from the neighboring vehicle.

7. The control system of claim 6, wherein the processor, when the neighboring vehicle is able to join the path of the autonomous vehicle, remotely controls the autonomous vehicle to physically meet the neighboring vehicle.

8. The control system of claim 6, wherein the processor, when the neighboring vehicle is unable to join the path of the autonomous vehicle, remotely controls the autonomous vehicle to follow the selected path.

9. A remote control method for an autonomous vehicle, comprising:
   receiving, by a processor, an emergency request message from the autonomous vehicle;
   requesting, by the processor, an ambulance to travel to a nearest hospital around the autonomous vehicle;
   determining, by the processor, a path with a shortest estimated required time among a path for the autonomous vehicle to physically meet the ambulance, and a path for the autonomous vehicle to travel to the hospital;
   transmitting, by the processor, the emergency request message to a neighboring vehicle when the path for the autonomous vehicle to physically meet the ambulance is selected or the path for the autonomous vehicle to travel to the hospital is selected;
   generating, by the processor, a path for the neighboring vehicle to join a path of the autonomous vehicle in response to receiving a message indicating that the neighboring vehicle has an occupant capable of performing cardiopulmonary resuscitation or first aid,
   calculating, by the processor, estimated times of the selected path and the path for the neighboring vehicle to join the path of the autonomous vehicle to compare them,
   transmitting, by the processor, the path for the neighboring vehicle to join the path of the autonomous vehicle to the neighboring vehicle when the estimated time of the selected path is longer than the estimated time of the path for the neighboring vehicle to join the path of the autonomous vehicle, and remotely controlling, by the processor, the autonomous vehicle to follow the path with the shortest estimated required time, wherein the neighboring vehicle is located within a predetermined range from the path for the autonomous vehicle to physically meet the ambulance, within a predetermined range from the path for the autonomous vehicle to travel to the hospital, or within a predetermined range from a current position of the autonomous vehicle.

* * * * *